United States Patent
Kim

(10) Patent No.: US 7,340,050 B2
(45) Date of Patent: Mar. 4, 2008

(54) APPARATUS AND METHOD FOR CONTROLLING INCOMING MELODY

(75) Inventor: Kyo-Weon Kim, Seoul (KR)

(73) Assignee: Samsung Electronics Co., Ltd., Suwon-si, Gyeonggi-do (KR)

(*) Notice: Subject to any disclaimer, the term of this patent is extended or adjusted under 35 U.S.C. 154(b) by 62 days.

(21) Appl. No.: 10/989,635

(22) Filed: Nov. 17, 2004

(65) Prior Publication Data

US 2005/0129192 A1    Jun. 16, 2005

(30) Foreign Application Priority Data

Dec. 11, 2003    (KR) .................... 10-2003-0090397

(51) Int. Cl.
*H04M 3/00*    (2006.01)
*H04M 1/00*    (2006.01)

(52) U.S. Cl. .................... 379/373.01; 379/207.16

(58) Field of Classification Search .................... 379/373.01–376.01
See application file for complete search history.

(56) References Cited

U.S. PATENT DOCUMENTS

| | | | |
|---|---|---|---|
| 4,856,055 A * | 8/1989 | Schwartz | 379/373.02 |
| 5,200,994 A * | 4/1993 | Sasano et al. | 379/142.06 |
| 5,220,599 A | 6/1993 | Sasano et al. | |
| 5,598,461 A * | 1/1997 | Greenberg | 379/88.24 |
| 5,649,007 A * | 7/1997 | Yamada | 379/375.01 |
| 5,854,826 A * | 12/1998 | Kim | 379/68 |
| 6,094,587 A | 7/2000 | Armanto et al. | |
| 6,190,227 B1 | 2/2001 | Oba | |
| 6,298,132 B1 | 10/2001 | Harada et al. | |
| 6,337,972 B1 | 1/2002 | Jones et al. | |
| 6,483,897 B1 | 11/2002 | Millrod | |
| 6,597,279 B1 | 7/2003 | Haraguchi | |
| 6,621,903 B2 * | 9/2003 | Oda | 379/374.01 |
| 6,636,602 B1 | 10/2003 | Vlacancich | |
| 6,697,470 B2 * | 2/2004 | McDonough | 379/142.01 |
| 6,745,040 B2 | 6/2004 | Zimmerman | |
| 2001/0024490 A1 * | 9/2001 | Oda | 379/88.01 |
| 2003/0012361 A1 * | 1/2003 | Yoshimura | 379/373.01 |

* cited by examiner

*Primary Examiner*—Ramnandan Singh
(74) *Attorney, Agent, or Firm*—Robert E. Bushnell, Esq.

(57) ABSTRACT

In an apparatus and method for controlling an incoming melody, a receiver's telephone terminal allows a caller who transmits a call request signal to select a specific receiver with whom the caller wants to establish a voice call. The receiver's telephone terminal outputs a unique incoming melody corresponding to the receiver selected by the caller so that a number of users that use the receiver's telephone terminal can clearly determine the receiver that the caller requests through the outputted incoming melody. As a result, a higher level of call service is provided to the users that use the telephone terminal.

17 Claims, 4 Drawing Sheets

APPARATUS AND METHOD FOR CONTROLLING INCOMING MELODY

CLAIM OF PRIORITY

This application makes reference to, incorporates the same herein, and claims all benefits accruing under 35 U.S.C. § 119 from an application for APPARATUS AND METHOD FOR CONTROLLING INCOMING MELODY earlier filed in the Korean Intellectual Property Office on 11 Dec. 2003 and there duly assigned Serial No. 2003-90307.

BACKGROUND OF THE INVENTION

1. Technical Field

The present invention relates to an apparatus and method for controlling an incoming melody and, more particularly, to an apparatus and method for controlling an incoming melody wherein, when a caller requests a voice call and designates a receiver for whom the voice call is intended, a receiver's telephone terminal outputs a unique incoming melody corresponding to the receiver that the caller designates, so that the corresponding receiver can check the voice call request.

2. Related Art

A method of controlling an incoming melody in the current telephone service can be generally divided into a method of using a CID (caller ID) and a method of outputting a designated incoming melody.

First, in the method of outputting the designated incoming melody, a user of a telephone terminal stores a specific incoming melody into the telephone terminal using melody input means, and when a call request signal is received from the caller's telephone terminal, the specific incoming melody inputted by the user is outputted.

That is, the user of the receiver's telephone terminal sets the specific incoming melody through the melody input means, and when the call request signal is received from an opposite or counterpart terminal, the receiver's telephone terminal checks whether or not the user set the specific incoming melody so that, if the specific incoming melody is not set, a default melody is outputted, whereas if the specific incoming melody is set, the set specific incoming melody is outputted.

However, in the method of outputting the designated incoming melody, the user simply designates one melody as an incoming one, and when the call request signal is received from any caller, the same incoming melody is outputted, so that there is a problem in that the receiver cannot check the caller's information until the voice call starts.

Further, in the method of using the CID, the user of the telephone terminal designates an incoming melody according to the caller's CID, and sets the incoming melody to the telephone terminal. When the call request signal is received from the caller's telephone terminal, the incoming melody is retrieved according to the caller's CID so as to output the corresponding incoming melody.

However, in the method of using the CID, the incoming melody is outputted according to the CID that the receiver designates, so that the receiver can check the caller's information, but there is a problem in that the user of the telephone terminal has to apply for a paid CID service.

Further, in the method of using the CID, it is troublesome to set each incoming melody in correspondence to the caller's CID, and when the call request signal transmitted from the caller's telephone terminal has a CID that does not set the incoming melody, an incoming melody service that makes the incoming melody different according to the caller's telephone terminal cannot be provided.

Further, in the method of using the CID, the receiver can check the caller's information through the incoming melody, but cannot check the exact incoming information indicating that the caller wants to make a voice call.

That is, there is a problem in that, although the caller requests a voice call to a receiver 'A', when a receiver 'B' is adjacent to the receiver's telephone terminal, the receiver 'B' will first take the voice call with the caller through the telephone terminal, and then switch back to the receiver 'A'.

The following patents are considered to be generally pertinent to the present invention, but are burdened by the disadvantages set forth above: U.S. Pat. No. 6,745,040 to Zimmerman, entitled METHOD AND SYSTEM FOR PROCESSING INCOMING CALLS ON A COMMUNICATION UNIT, issued on Jun. 1, 2004; U.S. Pat. No. 6,636,602 to Vlacancich, entitled METHOD FOR COMMUNICATING, issued on Oct. 21, 2003; U.S. Pat. No. 6,621,903 to Oda, entitled PORTABLE TELEPHONE SET AND METHOD FOR INPUTTING SAID INCOMING CALL REPORTING MELODY, issued on Sep. 16, 2003; U.S. Pat. No. 6,597,279 to Haraguchi, entitled PORTABLE INFORMATION TERMINAL AND METHOD OF SETTING THE SAME, issued on Jul. 22, 2003; U.S. Pat. No. 6,483,897 to Millrod, entitled METHOD AND APPARATUS FOR ANSWERING A TELEPHONE WITH SPEECH, issued on Nov. 19, 2002; U.S. Pat. No. 6,337,972 to Jones et al., entitled MELODIC ALERTS FOR COMMUNICATIONS DEVICE, issued on Jan. 8, 2002; U.S. Pat. No. 6,298,132 to Harada et al., entitled RINGING-TONE CONTROL DEVICE FOR TELEPHONE SET, USING AUDIO SIGNAL SENT BY CALLER, issued on Oct. 2, 2001; U.S. Pat. No. 6,190,227 to Oba, entitled INCOMING CALL REPORTING TOY, issued on Feb. 20, 2001; U.S. Pat. No. 6,094,587 to Armanto et al., entitled PROGRAMMING OF A TELEPHONE'S RINGING TONE, issued on Jul. 25, 2000; U.S. Pat. No. 5,220,599 to Sasano et al., entitled COMMUNICATION TERMINAL APPARATUS AND ITS CONTROL METHOD WITH PARTY IDENTIFICATION AND NOTIFICATION FEATURES, issued on Jun. 15, 1993; and U.S. Pat. No. 5,200,994 to Sasano etal., entitled COMMUNICATION TERMINAL APPARATUS AND CONTROL METHOD WITH PARTY IDENTIFICATION FEATURES, issued on Apr. 6, 1993.

SUMMARY OF THE INVENTION

It is, therefore, an objective of the present invention to provide an apparatus and method for controlling an incoming melody, wherein a receiver's telephone terminal allows a caller who transmits a call request signal to select a specific receiver to whom the caller wants to make a voice call, and outputs a unique incoming melody corresponding to the receiver selected by the caller so that a number of users that use the receiver's telephone terminal can clearly confirm who should respond to the received call request via the outputted incoming melody.

According to an aspect of the present invention, there is provided an apparatus for controlling an incoming melody, comprising: an input unit for inputting a voice guidance message for receiver selection, a key tone frequency corresponding to each receiver, and a melody corresponding to the key tone frequency; a storage unit for storing information inputted through the input unit; a tone detection unit for detecting a key tone signal from signals transmitted from an opposite terminal to provide key tone information; and a control unit including an incoming ring processing portion which, when a call request signal is received from the opposite terminal, transmits the voice guidance message stored in the storage unit to the opposite terminal, and sends the incoming melody corresponding to the key tone information provided by the tone detection unit.

According to another aspect of the present invention, there is provided an apparatus for controlling an incoming melody, comprising: an input unit for inputting a voice guidance message for receiver selection, a receiver selection signal corresponding to each receiver, and a melody corresponding to the receiver selection signal; a storage unit for storing information inputted through the input unit; a voice recognition unit for recognizing a voice signal transmitted from an opposite terminal to provide the receiver selection signal which the voice signal represents; and a control unit including an incoming ring processing portion which, when a call request signal is received from the opposite terminal, transmits the voice guidance message stored in the storage unit to the opposite terminal, and sends the incoming melody corresponding to the receiver selection signal provided from the voice recognition unit.

Further, according to another aspect of the present invention, there is provided a method of controlling an incoming melody, comprising the steps of: setting a receiver selection voice guidance message and the incoming melody corresponding to each receiver; when a call request signal is received from an opposite terminal, transmitting the voice guidance message to the opposite terminal; detecting a receiver selection signal received from the opposite terminal; and sending the incoming melody corresponding to the receiver selection signal.

Further, the selection signal used herein is a voice or a key tone frequency signal transmitted from the opposite terminal.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

An apparatus and method for controlling an incoming melody according to the present invention will now be described more fully hereinafter with reference to the accompanying drawings.

The invention will first be described for the case of selecting a receiver using a key button.

Figure 1:
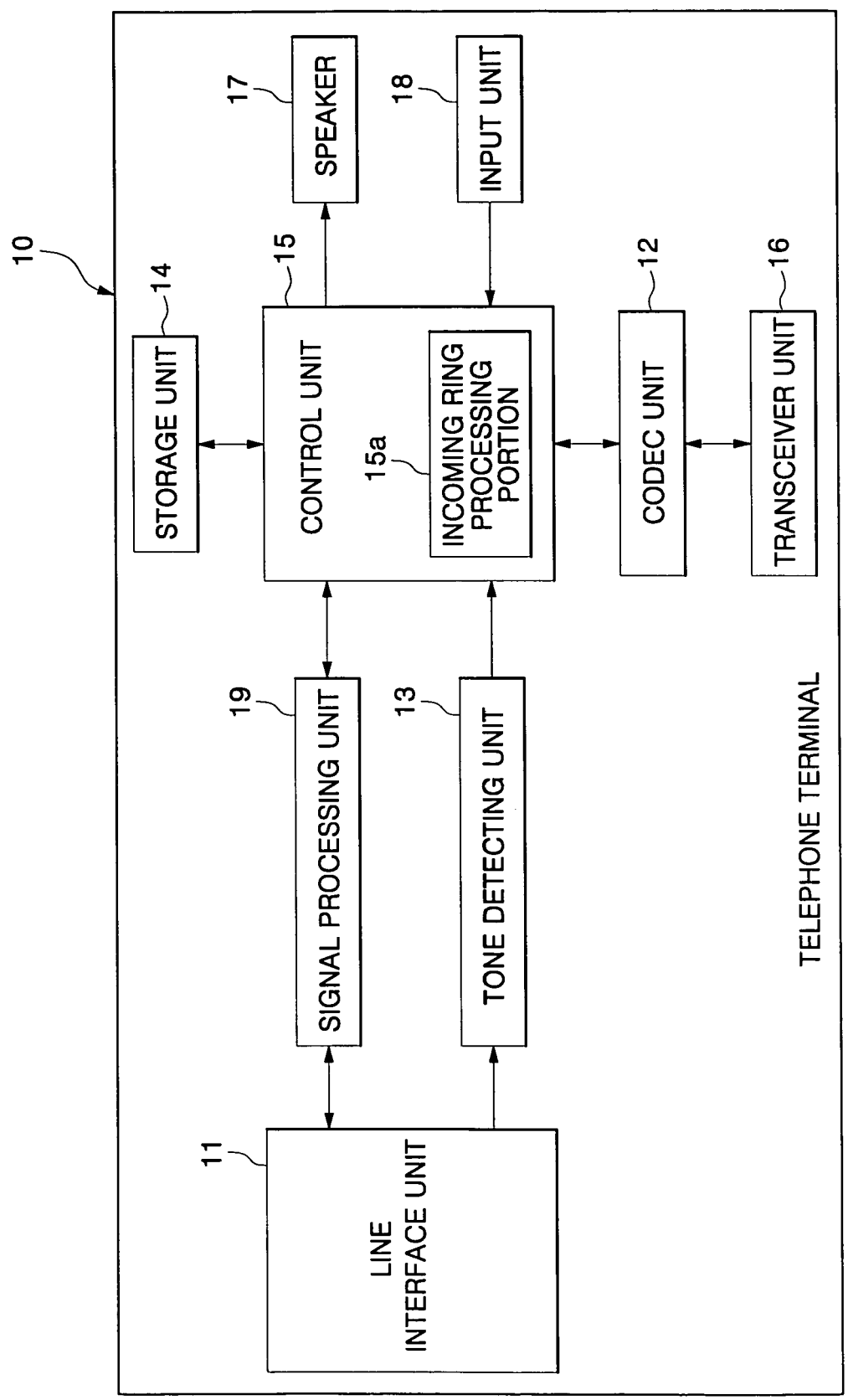
FIG. 1 is an internal block diagram illustrating a configuration of an apparatus for controlling an incoming ring in a telephone terminal according to an embodiment of the present invention.

FIG. 1 is an internal block diagram illustrating a configuration of an apparatus for controlling an incoming ring in a telephone terminal according to an embodiment of the present invention.

Referring to FIG. 1, a telephone terminal 10 is composed of a line interface unit 11, a codec unit 12, a tone detection unit 13, a storage unit 14, a transceiver unit 16, a speaker 17, an input unit 18, a signal processing unit 19, and a control unit 15. Further, the control unit 15 includes an incoming ring processing portion 15a.

The line interface unit 11 interfaces to transmit/receive a signal through a signal line connected to the telephone terminal 10. The signal line of the line interface unit 11 can be connected to a Public Switched Telephone Network (PSTN), a private network, and a VoIP (voice over IP) network etc., but hereinafter, it will be described based on the assumption that it is connected to the PSTN network.

Further, the signal processing unit 19 processes the signal received through the line interface unit 11. That is, a level or a state of the signal received through the line interface unit 11 is filtered or standardized so that an original random noise is distinguished from regular signals. The signal processing unit 19 can use a DSP (digital signal processing) circuit, or the like.

The tone detection unit 13 detects a ring tone from the signal received from the PSTN through the line interface unit 11.

The tone detection unit 13 detects a key tone frequency from the signal received through the line interface unit 11, where the "key tone frequency" is a DTMF (dual tone multi frequency) 11 which is a specific frequency generated when a 4×3 arrangement button (not shown) of the telephone terminal 10 is pressed.

The input unit 18 receives keytone frequency information, voice information and melody information from the receiver that uses the telephone terminal 10, and transmits them to the incoming ring processing portion 15a.

That is, when the receiver inputs a voice guidance message for receiver selection to be transmitted to the caller through the input unit 18, key tone frequency information to be transmitted from the caller's telephone terminal according to the corresponding receiver selection voice guidance message, and melody information to be outputted through the speaker 17 according to the key tone frequency received from the caller, the incoming ring processing portion 15a stores each piece of information that the receiver inputs in the storage unit 14.

The receiver selection voice guidance message as shown in Table 1 can be sent.

TABLE 1

| Voice guidance message |
|---|
| No. 1 for father |
| No. 2 for mother |
| No. 3 for Gil-dong |

The voice guidance message is a voice transmitted to the caller, when the call request signal is transmitted from the caller.

Further, when the receiver selects an automatic response mode, the input unit 18 11 generates an automatic response mode signal and transmits it to the incoming ring processing portion 15a.

Each piece of information stored in the storage unit 14 can be stored in a voice (melody) information table as in the following Table 2.

TABLE 2

| Key tone frequency | Melody information | Absence information |
|---|---|---|
| No. 1 tone frequency | No. 1 melody | Yes |
| No. 2 tone frequency | No. 2 melody | Yes |
| No. 3 tone frequency | No. 3 melody | No (absent) |
| ... | ... | ... |

In the voice (melody) information table stored as Table 2, the key tone frequency field is a key tone frequency received according to the button selected by the caller who listens to the voice guidance message. The melody information field is an incoming ring melody outputted according to the key tone frequency detected by the tone detection unit 13. The absence information field is provided to advise of an absence when there is an absent person among the members included in the guidance message, where 'yes' indicates a 'not absent' state and 'no' indicates an 'absent' state.

As described, any user that uses the receiver's telephone terminal 10 randomly selects and stores the voice, the key tone frequency information, the incoming ring melody and the absence information through the input unit 18.

Further, for each piece of information stored in the storage unit 15, the key tone frequency information field, the melody information field, and the absence information field can be stored either in one table or in separate tables as in Table 2 above.

When the call request signal is received from the caller's telephone terminal through the line interface unit 11, the incoming ring processing portion 15a transmits the voice guidance message stored in the storage unit 14 so that the caller can listen to it.

Further, after listening to the received voice guidance message, the caller selects a keypad button. When the corresponding key tone frequency is transmitted, the tone detection unit 13 detects the key tone frequency transmitted from the caller, and transmits the corresponding key tone frequency to the incoming ring processing portion 15a.

The incoming ring processing portion 15a searches for an incoming ring melody that corresponds to the key tone frequency transmitted from the tone detection unit 13.

Furthermore, the incoming ring processing portion 15a outputs an identified incoming ring melody through the speaker 17, so that the receivers using the telephone terminal 10 can clearly confirm the receiver to which the caller wants to make a call by means of the incoming ring melody.

Then, the transceiver unit 16 allows the receiver to establish a voice call with the caller. That is, after the receiver listens to the incoming ring melody outputted through the speaker, if he picks up the transceiver unit 16 and the line becomes busy, the voice transmitted by the caller is outputted so that the user can listen to it, and the voice transmitted by the receiver is transmitted to the caller.

The code unit 12 converts the voice signal transmitted from the caller's telephone terminal into a voice which the receiver can listen to, and converts the voice inputted by the receiver into a voice signal to be transmitted through the line interface unit 11.

The case of selecting a receiver using voice recognition will now be described.

Figure 2:
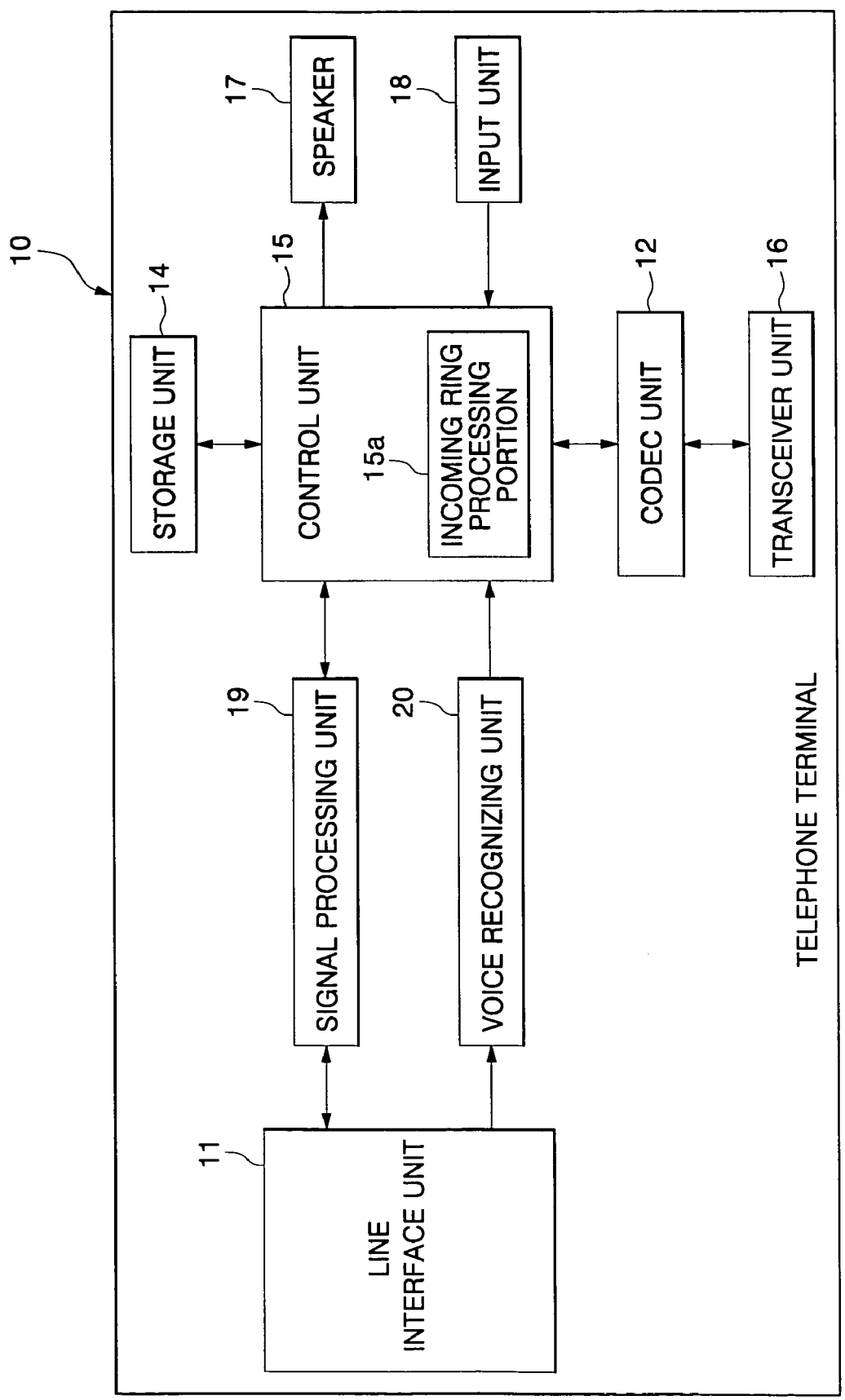
FIG. 2 is an internal block diagram illustrating a configuration of an apparatus for controlling an incoming ring in a telephone terminal according to another embodiment of the present invention.

FIG. 2 is an internal block diagram illustrating a configuration of an apparatus for controlling an incoming ring in a telephone terminal according to another embodiment of the present invention.

Referring to FIG. 2, a telephone terminal 10 is composed of a line interface unit 11, a code unit 12, a voice recognition unit 20, a storage unit 14, a transceiver unit 16, a speaker 17, an input unit 18, a signal processing unit 19, and a control unit 15.

The configuration for selecting the receiver through voice recognition is the same general configuration as shown in FIG. 1 except that voice recognition unit 20 replaces tone detection unit 13. Therefore, a detailed description of this configuration will be omitted.

It is sufficient to state that, instead of the tone detection unit 13 that detects a DTMF 11 signal (that is, a frequency generated when a key button (not shown) of the telephone terminal 10 is pressed to recognize a receiver's selection number), voice recognition unit 20 which is capable of identifying the voice of the caller is provided.

The voice recognition unit 20 recognizes the voice transmitted from the caller, identifies the receiver selection number, and then informs the incoming ring processing portion 15a as to which number is selected.

If the caller says "No. 1", the voice recognition unit 20 in the receiver's telephone terminal 10 recognizes "No. 1".

TABLE 3

| Number recognized at the voice recognition unit | Melody information | Absence information |
|---|---|---|
| No. 1 | No. 1 melody | Yes |
| No. 2 | No. 2 melody | Yes |
| No. 3 | No. 3 melody | No (absent) |
| ... | ... | ... |

Therefore, with the table stored as in Table 3, the receiving terminal sends No. 1 melody, and when the caller selects No. 3, a pre-stored voice guidance message informing of the absence of No. 3 is sent.

A process of selecting a receiver by use of the key button will now be described.

Figure 3:
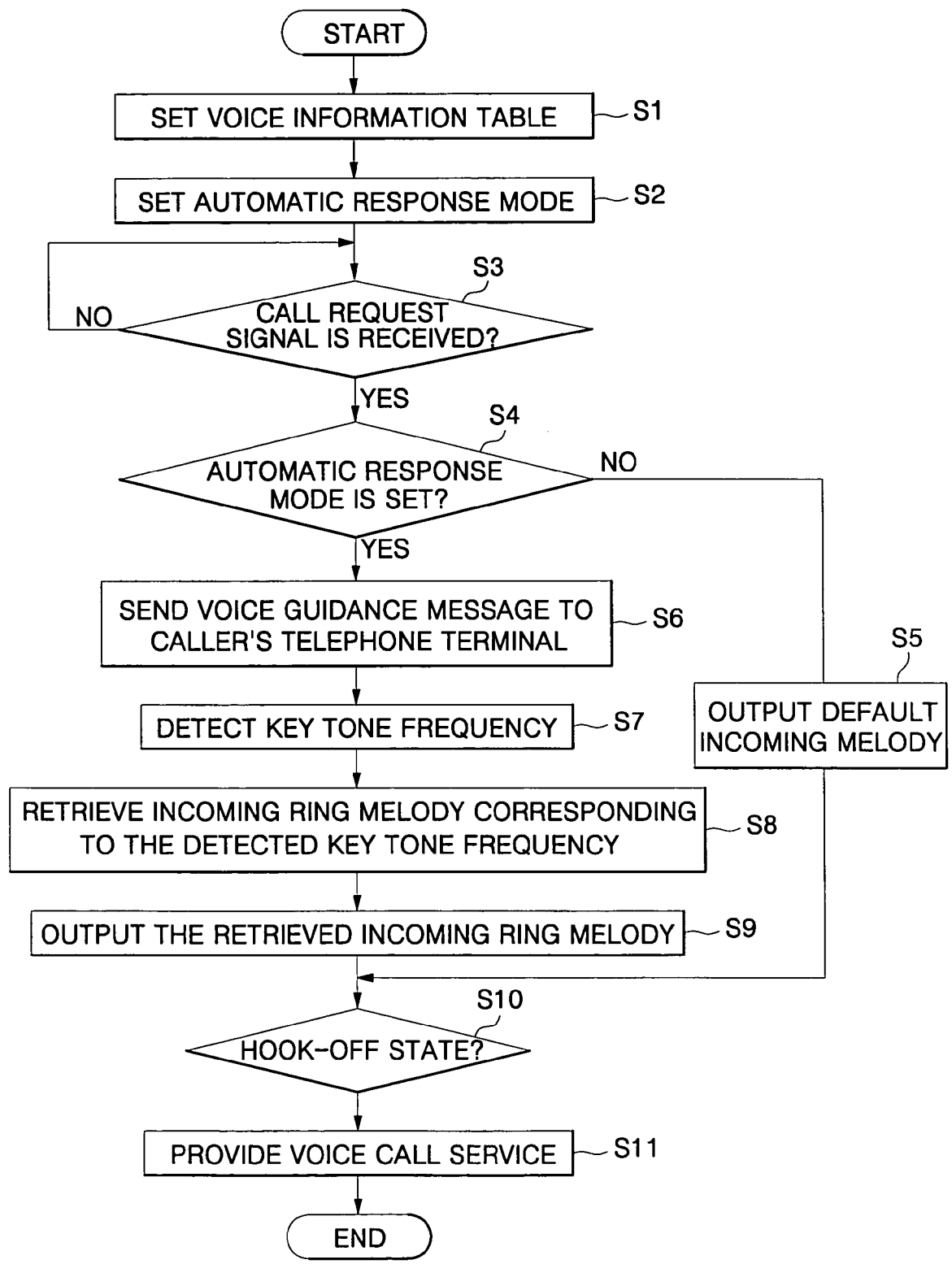
FIG. 3 is a flow chart illustrating a method of controlling an incoming ring in a telephone terminal according to an embodiment of the present invention.

FIG. 3 is a flow chart illustrating a method of controlling an incoming ring in a telephone terminal according to an embodiment of the present invention.

The input unit 18 receives key tone frequency information, the voice guidance message and incoming ring melody information from any receiver, and transmits that information to the incoming ring processing portion 15a.

Then, the incoming ring processing portion 15a stores the voice (melody) information table, as in Table 2 above, in the storage unit 14 by using the received key tone frequency information, the received voice guidance message, and the incoming melody information (S1).

When the receiver selects an automatic response mode, the input unit 18 generates an automatic response mode signal, and transmits it to the incoming ring processing portion 15a. When the automatic response mode signal is received from the input unit 18, the incoming ring processing portion 15a checks the mode state of the current telephone terminal 10.

Furthermore, when the current telephone terminal is set to the automatic response mode, the incoming ring processing portion 15a releases the automatic response mode, and if not, sets the automatic response mode (S2).

The incoming ring processing portion 15a processes the automatic response mode, and determines whether or not a call request signal is received from an opposite telephone terminal through the line interface unit 11 (S3).

When the call request signal is received from the opposite telephone terminal, the incoming ring processing portion 15a determines whether or not the automatic response mode is set (S4).

As a result of that determination, when the automatic response mode is not set, the current telephone terminal 10 outputs a default incoming ring melody set to the telephone terminal 10 through the speaker 17 (S5).

However, when the current telephone terminal 10 is not set to the automatic response mode, the incoming ring processing portion 15a transmits the voice guidance message stored in the storage unit 14 to the opposite telephone terminal (S6).

Next, the caller that uses the opposite telephone terminal listens to the voice guidance message transmitted from the receiver's telephone terminal 10, and selects a button corresponding to the receiver with whom the caller wants to establish a voice call.

The caller's telephone terminal generates and transmits a key tone frequency corresponding to the button selected by the caller, and the receiver's telephone terminal 10 receives the key tone frequency (S7).

More specifically, the tone detection unit 13 of the receiver's telephone terminal 10 detects the key tone frequency from the signal received through the line interface unit 11, and transmits the detected key tone frequency information to the incoming ring processing portion 15a.

The incoming ring processing portion 15a retrieves an incoming ring melody corresponding to the received key tone frequency from the voice (melody) information table stored in the storage unit 14 (S8).

That is, when the call request signal is received from the caller's telephone terminal, the receiver's telephone terminal 10 sends the voice guidance messages, such as "No. 1 for father", "No. 2 for mother" and "No. 3 for Gil-dong", to the caller's telephone terminal from the table stored as shown in Table 1, and the caller uses the telephone terminal to select a receiver by pressing a button corresponding to one of the received voice guidance messages.

For example, when the caller wishes to make a voice call to father, the caller selects No. 1 button, and the caller's telephone terminal generates the key tone frequency corresponding to the No. 1 button selected by the caller, and transmits it to the receiver's telephone terminal 10.

Then, the tone detection unit 13 of the receiver's telephone terminal 10 detects the No. 1 key tone frequency received through the line interface unit 11, and transmits it to the incoming ring processing portion 15a.

The incoming ring processing portion 15a retrieves the incoming ring melody corresponding to the No. 1 key tone frequency provided by the tone detection unit 13, and outputs the retrieved 'No. 1 melody' through the speaker 17 (S9).

Therefore, the receivers making use of the receiver's telephone terminal 10 can confirm that the receiver, with whom the caller wants to establish a call, is 'father' by means of the 'No. 1' melody, which is the incoming ring melody. Thus, any inconvenience, caused by the fact that a receiver could be compelled to pass the telephone over to 'father' after making a voice call with the caller, can be avoided.

Furthermore, the incoming ring processing portion 15a of the receiver's telephone terminal 10 determines whether or not the receiver picks up the transceiver unit 16 and the line is in a busy state (S10). If the receiver picks up the transceiver unit 16, and thus the line is busy, the voice call service is provided between the caller and the receiver (S11).

That is, with the incoming ring melody outputted by the receiver's telephone terminal 10, when the receiver to whom the user wants to make a call picks up the transceiver unit 16, and thus the line becomes busy, the incoming ring processing portion 15a converts the voice signal received through the line interface unit 11 into a voice that the receiver can listen to in the code unit12, and outputs it through the transceiver unit 16. Further, the code unit 12 converts the voice, which the receiver inputs through the transceiver unit 16, into a voice signal to be transmitted through the line interface unit 11, and then transmits the converted voice signal to the caller's telephone terminal.

If the detected key tone frequency corresponds to No. 3, it can be determined from the voice information table whether or not the member is absent through the absence information field of the member that corresponds to No. 3.

In this case, the current selected receiver sends the voice guidance message advising of the absence to the receiver's telephone terminal, and since the corresponding receiver is absent, the receiver's telephone terminal 10 does not output the incoming ring melody.

A process of selecting a receiver through voice recognition will now be described.

Figure 4:
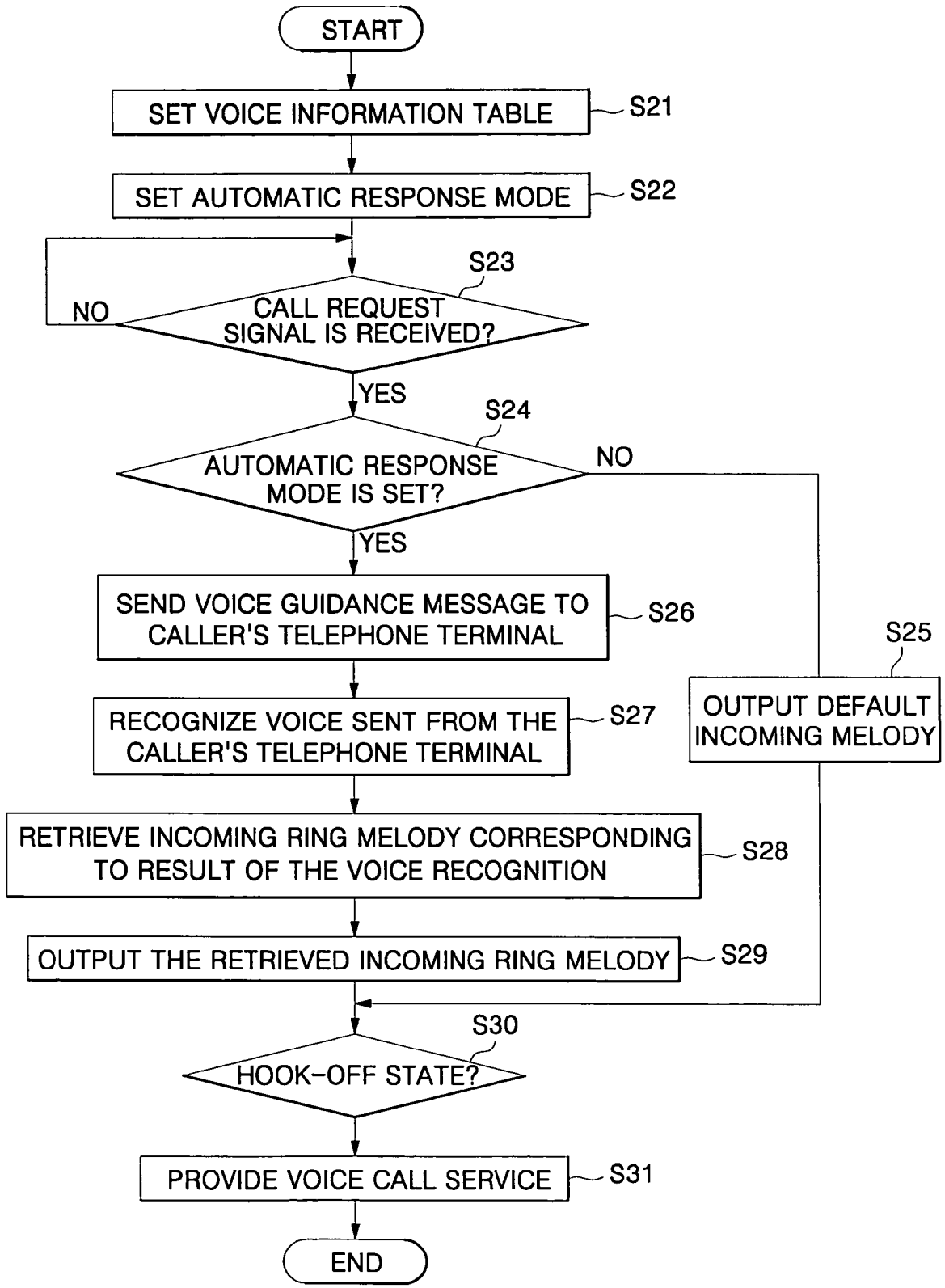
FIG. 4 is a flow chart illustrating a method of controlling an incoming ring in a telephone terminal according to another embodiment of the present invention.

FIG. 4 is a flow chart illustrating a method of controlling an incoming ring in a telephone terminal according to another embodiment of the present invention.

The process of selecting a receiver through voice recognition is generally the same as that illustrated in FIG. 3, and therefore the overall explanation will be skipped.

However, the difference resides in the step of selecting the receiver selection number from the caller's telephone terminal through voice recognition after the voice guidance message stored in the storage unit 14 is transmitted to the incoming ring processing portion 15a of the opposite telephone terminal (S26), which will be described in more detail.

When a call request signal is transmitted from the caller's telephone terminal, the receiver selection voice guidance message is transmitted to the caller's telephone terminal, and the caller transmits a "voice" corresponding to a number for selecting the receiver.

Here, the transmitted "voice" will be a number, corresponding to "No. 1", "No. 2", or "No. 3" etc.

When the voice for this number is transmitted from the caller's telephone terminal, this voice is recognized in the voice recognition unit 20 of the receiver's telephone terminal (S27).

The incoming ring-processing portion 15a retrieves the incoming ring melody, which corresponds to the receiver selection number recognized at the voice recognition unit 20, from the voice (melody) information table stored in the storage unit 14 (S28).

That is, when the call request signal is received from the caller's telephone terminal, the receiver's telephone terminal 10 sends the voice guide message, such as "No.1 for father", "No. 2 for mother" and "No. 3 for Gil-dong" to the caller's telephone terminal from the table stored as in Table 1, and when the number corresponding to the received voice guidance message is spoken, the caller's telephone terminal sends the voice for this number to the receiver's telephone terminal 10.

Furthermore, the voice recognition unit 20 of the receiver's telephone terminal 10 recognizes the voice for the number transmitted through the line interface unit 11, and transmits it to the incoming ring processing portion 15a.

The incoming ring processing portion 15a retrieves the incoming ring melody corresponding to the number provided from the voice recognition unit 20, and outputs the retrieved melody through the speaker 17 (S29).

Therefore, the receivers that use the receiver's telephone terminal 10 can confirm a receiver with whom the caller wants to establish a call by the outputted incoming ring melody, so that any inconvenience, caused by the fact that any other receiver could be compelled to pass the telephone over to the receiver with whom the caller originally wants to make a call after making a voice call with the caller, can be avoided.

Furthermore, the incoming ring processing portion 15a of the receiver's telephone terminal 10 determines whether or not the receiver picks up the transceiver unit 16, so that the line is busy (S 30). If the receiver picks up the transceiver unit 16 and the line is busy, a voice call service is provided between the caller and the receiver (S 31).

As described above, according to the present invention, a caller who requests voice call service directly selects a voice call party that he wishes to call, and a receiver's telephone terminal outputs an incoming ring melody according to the voice call party selected by the caller. Thus, it is advantageous that the user of the receiver's telephone terminal can determine the receiver with whom the current caller wishes to establish a voice call through the incoming ring melody.

Advantageously, the inconvenience caused by the fact that the incoming melody corresponding to the caller's telephone terminal should be set respectively is avoided, and different incoming melodies, depending on the caller's selection, can be outputted without using additional service.

Furthermore, when a member is absent, a voice guidance message advising of the absence of the corresponding member is sent to an outgoing terminal, so that it is possible for the receiver's terminal to avoid the trouble or inconvenience of answering unnecessary phone calls, the trouble or inconvenience being caused by the incoming melody which is not outputted. Thus, the caller can promptly check for the absence of the receiver with whom he or she wants to establish a call, thereby maximizing the user's convenience.

Although the present invention has been described with reference to specific embodiments, those skilled in the art will appreciate that a variety of modifications and changes can be made without departing from the scope of the present invention, as indicated by the appended claims.

What is claimed is:

1. An apparatus for controlling an incoming melody, comprising:
   an input unit for inputting a voice guidance message for receiver selection, a key tone frequency corresponding to each receiver, and a melody corresponding to the key tone frequency;
   a storage unit for storing information inputted through the input unit including the voice guidance message;
   a tone detection unit for detecting a key tone signal from signals transmitted from an opposite terminal to provide key tone information; and
   a control unit which, when a call request signal is received from the opposite terminal, transmits the voice guidance message stored in the storage unit to the opposite terminal, and sends the incoming melody corresponding to the key tone information provided by the tone detection unit;
   wherein, when an automatic response mode signal is received from the input unit, the control unit determines a current mode state, and when the current mode state is not the automatic response mode state, the control unit sets the automatic response mode.

2. The apparatus according to claim 1, wherein the control unit comprises an incoming ring processing portion.

3. The apparatus according to claim 1, wherein, when a user selects an automatic response mode, the input unit generates and provides an automatic response mode signal.

4. The apparatus according to claim 1, wherein, when the call request signal is received from the opposite terminal, the control unit determines a current mode state, and then, when the current mode state is not the automatic response mode state, a default incoming melody is outputted.

5. The apparatus according to claim 1, wherein the tone detection unit detects a key tone signal of a Dual Tone Multi Frequency type from the signals received from the opposite terminal.

6. An apparatus for controlling an incoming melody, comprising:
   an input unit for inputting a voice guidance message for receiver selection, a key tone frequency corresponding to each receiver, and a melody corresponding to the key tone frequency,
   a storage unit for storing information inputted through the input unit including the voice guidance message;
   a tone detection unit for detecting a key tone signal from signals transmitted from an opposite terminal to provide key tone information; and
   a control unit which, when a call request signal is received from the opposite terminal, transmits the voice guidance message stored in the storage unit to the opposite terminal, and sends the incoming melody corresponding to the key tone information provided by the tone detection unit;
   wherein the storage unit is provided with a table comprising:
   a receiver selection number field sent in the voice guidance message;
   a melody information field corresponding to the receiver selection number field; and
   an absence information field for indicating absence of a receiver.

7. An apparatus for controlling an incoming melody, comprising:
   an input unit for inputting a voice guidance message for receiver selection, a receiver selection signal corresponding to each receiver, and a melody corresponding to the receiver selection signal;
   a storage unit for storing information inputted through the input unit including the voice guidance message;
   a voice recognition unit for recognizing a voice signal transmitted from an opposite terminal so as to provide the receiver selection signal represented by the voice signal; and
   a control unit which, when a call request signal is received from the opposite terminal, transmits the voice guidance message stored in the storage unit to the opposite terminal, and sends the incoming melody corresponding to the receiver selection signal provided by the voice recognition unit;
   wherein, when an automatic response mode signal is received from the input unit, the control unit determines a current mode state, and when the current mode state is not the automatic response mode state, the control unit sets the automatic response mode.

8. The apparatus according to claim 7, wherein the control unit comprises an incoming ring processing portion.

9. The apparatus according to claim 7, wherein, when a user selects an automatic response mode, the input unit generates and provides an automatic response mode signal.

10. The apparatus according to claim 7, wherein, when the call request signal is received from the opposite terminal, the control unit determines a current mode state, and then, when the current mode state is not the automatic response mode state, a default incoming melody is outputted.

11. The apparatus according to claim 10, wherein the control unit comprises an incoming ring processing portion.

12. An apparatus for controlling an incoming melody, comprising:

an input unit for inputting a voice guidance message for receiver selection, a receiver selection signal corresponding to each receiver, and a melody corresponding to the receiver selection signal;

a storage unit for storing information inputted through the input unit including the voice guidance message;

a voice recognition unit for recognizing a voice signal transmitted from an opposite terminal so as to provide the receiver selection signal represented by the voice signal; and a control unit which, when a call request signal is received from the opposite terminal, transmits the voice guidance message stored in the storage unit to the opposite terminal, and sends the incoming melody corresponding to the receiver selection signal provided by the voice recognition unit;

wherein the storage unit is provided with a table comprising:

a receiver selection number field sent in the voice guidance message;

a melody information field corresponding to the receiver selection number field; and an absence information field for indicating absence of a receiver.

13. A method of controlling an incoming melody, comprising the steps of:

setting a receiver selection voice guidance message and an incoming melody corresponding to each receiver;

when a call request signal is received from an opposite terminal, transmitting the voice guidance message to the opposite terminal;

detecting a receiver selection signal received from the opposite terminal;

sending the incoming melody corresponding to the receiver selection signal;

generating an automatic response mode signal according to user selection;

when the automatic response mode signal is generated, determining a current mode state;

when the current mode state is not the automatic response mode state, setting the automatic response mode; and when the call request signal is received from the opposite terminal, determining the current mode state, and when the current state is not the automatic response mode state, outputting a default incoming melody.

14. The method according to claim 13, wherein the receiver selection signal is any one of a voice frequency signal and a key tone frequency signal transmitted from the opposite terminal.

15. The method according to claim 13, wherein the step of detecting the receiver selection signal includes a sub-step of detecting a key tone frequency signal of a Dual Tone Multi Frequency type.

16. The method according to claim 13, wherein the step of detecting the receiver selection signal includes a sub-step of detecting a voice from the signals received from the opposite terminal.

17. A method of controlling an incoming melody, coprrising the steps of:

setting a receiver selection voice guidance message and an incoming melody corresponding to each receiver;

when a call request sianal is received from an opposite terminal, transmitting the voice guidance message to the opposite terminal;

detecting a receiver selection signal received from the opposite terminal;

sending the incoming melody corresponding to the receiver selection signal; and before sending the incoming melody, determining whether the receiver corresponding to the receiver selection signal is set to be absent, and when the receiver corresponding to the receiver selection signal is set to be absent, informing the opposite terminal of absence.

* * * * *